United States Patent [19]
Gotoh et al.

[11] Patent Number: 5,261,677
[45] Date of Patent: Nov. 16, 1993

[54] SEAL RING

[75] Inventors: Kunihiko Gotoh; Yoshikazu Kobayashi, both of Tokyo, Japan

[73] Assignee: Nitto Kohki Co., Ltd., Tokyo, Japan

[21] Appl. No.: 896,964

[22] Filed: Jun. 11, 1992

[30] Foreign Application Priority Data

Jul. 30, 1991 [JP] Japan ............... 3-66812[U]

[51] Int. Cl.⁵ .............................. F16J 15/32
[52] U.S. Cl. .................. 277/206 A; 277/165; 277/207 R
[58] Field of Search ............. 277/103, 121, 165, 177, 277/173, 50, 206 R, 206 A, 205, 207 R, 210

[56] References Cited

U.S. PATENT DOCUMENTS

| | | | |
|---|---|---|---|
| 2,841,429 | 7/1958 | McCuistion | 277/206 A |
| 2,888,281 | 5/1959 | Ratti | 277/206 A |
| 3,158,376 | 11/1964 | Rentschler | 277/205 |
| 3,189,360 | 6/1965 | Haberkorn | 277/205 |
| 3,228,705 | 1/1966 | Underwood | 277/206 |
| 3,909,018 | 9/1975 | Chaplain | 277/206 A |
| 4,190,259 | 2/1980 | Zitting | 277/165 |
| 4,438,935 | 3/1984 | Lees | 277/177 |
| 4,582,330 | 4/1986 | Lew et al. | 277/206 A |

FOREIGN PATENT DOCUMENTS

| | | |
|---|---|---|
| 62-4679 | 1/1987 | Japan . |
| 62-108661 | 7/1987 | Japan . |
| 810625 | 3/1959 | United Kingdom . |
| 2008692 | 6/1979 | United Kingdom . |

Primary Examiner—William A. Cuchlinski, Jr.
Assistant Examiner—Daniel G. DePumpo
Attorney, Agent, or Firm—Wenderoth, Lind & Ponack

[57] ABSTRACT

A seal ring seals between a first member and a second member. The second member is provided with a circular groove having two side surfaces opposite each other and a bottom surface connected to the side surfaces. The seal ring is mounted in the circular groove of the second member. The seal ring includes a projection in contact with the first member, a pair of elastic outer leg portions, and a pair of elastic inner leg portions. The outer leg portions are connected to the projection and are in contact with respective side surfaces. The inner leg portions define side recesses between the inner leg portions and the outer leg portions, and are in contact with the side surfaces and the bottom surface.

5 Claims, 2 Drawing Sheets

SEAL RING

BACKGROUND OF THE INVENTION

This invention relates to a seal ring useful for sealing fluids.

A conventional O-ring made of an electic material is well known as an element for sealing fluids. As shown in FIGS. 1 through 3, an O-ring 30 is accommodated in a circular groove 33 formed on an outer peripheral surface of a shaft member 32. As shown in FIG. 2, when the shaft member 32 is inserted into a cylindrical member 35 in a direction designated by an arrow N, the O-ring 30 is pressed by an inner peripheral surface 36 of the cylindrical member 35 to be deformed. That is because the O-ring 30 is formed so that an outer peripheral portion of the O-ring 30 is larger than the inner peripheral surface 36 of the cylindrical member 35 in diameter. In this case, the O-ring 30 is compressed in a radial direction in the circular groove 33. Thus, a space 38 defined by the inner peripheral surface 36 and the shaft member 32 is sealed by the O-ring 30.

The conventional O-ring 30 is compressed 15% through 20% of the volume thereof when sealing fluid. The more the O-ring 30 is compressed, the more the seal performance of the O-ring 30 is enhanced. As shown in FIG. 3, when inner pressure is applied to the O-ring 30 in a direction designated by an arrow P, the O-ring 30 is moved in an axial direction (for example, upwardly FIG. 3) in the circular groove 33. When a part 30c of the O-ring 30 is pressed into the space 38 between the cylindrical member 35 and the shaft member 32, the insertion load and sliding resistance is increased. As a result, it is difficult to fit the shaft member 32 into the cylindrical member 35 and to disconnect the shaft member 32 from the cylindrical member 35. In this case, however, if the deformation of the O-ring 30 is reduced in order to improve the operational performance, the seal performance becomes incomplete.

SUMMARY OF THE INVENTION

It is therefore an object of the present invention to provide a seal ring which can increase the sealing face pressure, and while also reduce an inserting force, by keeping the contact area with the member being inserted as small as possible.

The above and other objects are achieved by providing a seal ring for sealing between a first member and a second member, the second member being provided with a circular groove having side surfaces opposite each other and a bottom surface connected to the side surafaces. The seal ring is mounted in the circular groove of the second.

The seal ring comprises: a projection in contact with the first member, a pair of elastic outer leg portions connected to the projection in contact with the respective side surfaces and a pair of elastic inner leg portions defining side recesses between the inner leg portions and the outer leg in contact with the side surfaces and the bottom surface.

DETAILED DESCRIPTION OF THE PREFERRED EMBODIMENTS

A first embodiment according to the present invention will be described hereinafter with reference to the accompanying drawings.

Figure 1:
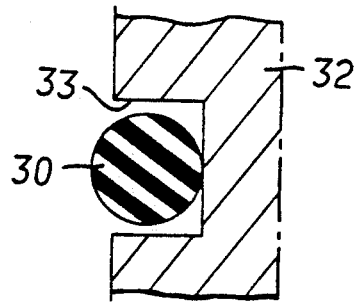
FIG. 1 is a sectional view showing a conventional seal ring.
Figure 2:
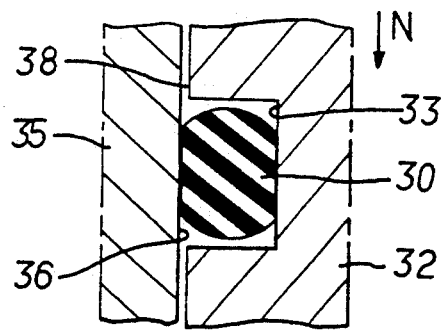
FIG. 2 is a sectional view showing the conventional seal ring of FIG. 1 pressed in a radial direction.
Figure 3:
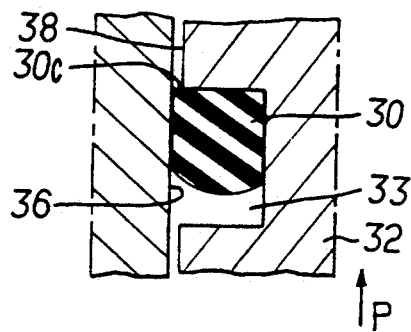
FIG. 3 is a sectional view showing the conventional seal ring of FIG. 1 being immoderatly deformed.
Figure 4:
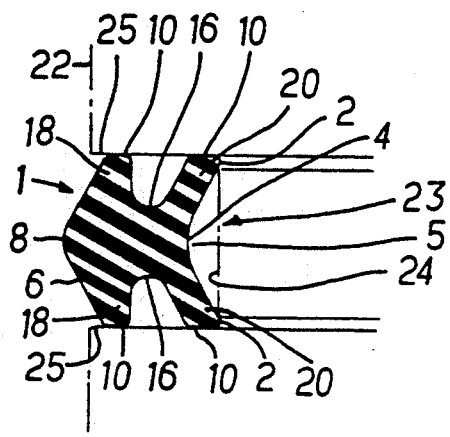
FIG. 4 is a sectional view showing a seal ring of a first embodiment according to the present invention.
Figure 5:
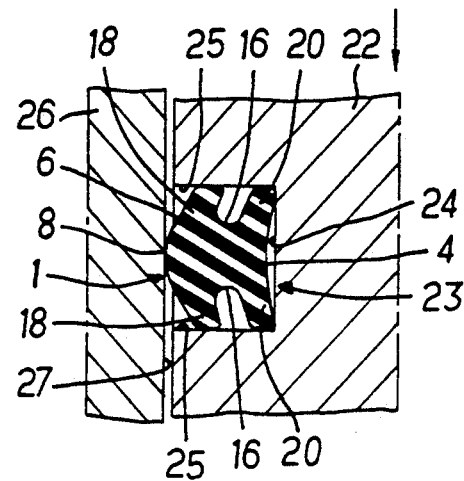
FIG. 5 is a sectional view showing the seal ring of FIG. 4 pressed in a radial direction.

Referring to FIGS. 4 and 5, a cylindrical member 22 is provided with a circular groove 23 on a peripheral surface thereof. A seal ring 1 is mounted in the circular groove 23. The seal ring 1 is made of an elastic material such as rubber, and is formed in a circular shape.

A sectional configuration of the seal ring 1 will be described with reference to FIG. 4. The seal ring 1 is mounted on the circular groove 23 in contact with a bottom surface 24 of the circular groove 23. The seal ring 1 is provided with a substantially V-shaped projection 8 on a member inserting face side 6. The projection 8 projects outwardly, and has a tip formed in a semicircular shape. As shown by a dotted line in FIG. 4, when the shaft member 22 is not yet inserted into a cylindrical member 26, the projection 8 projects out of the circular groove 23.

The circular groove 23 has two side surfaces 25 which oppose each other. The side surfaces 25 are connected by a bottom surface 24. The seal ring 1 has a pair of elastic outer leg portions 18 which are connected to the projection 8. Each end portion 10 of the outer leg portions 18 is in contact with a respective side surfaces 25 respective. A pair of side recesses 16 are formed on the inner side of the outer leg portions 18. Each side recess 16 is formed in a circular shape with a center the same as that of the seal ring 1. A pair of elastic inner leg portions 20 are formed on the inner side of the side recesses 16. Each end portion 10 of the inner leg portions 2 is in contact with one of the side surfaces 25 and the bottom surface 24 of the circular groove 23. Each inner side surface of the outer leg portions 18 are formed substantially in parallel with the axis of the shaft member 22. The outer side surfaces of the inner leg portions 20 extend inwardly towards the side surfaces 25 in an oblique direction. Thus, the side recesses 16 are formed. The inner leg portions 20 have contact faces 22 formed in a plane surface, in contact with the bottom surface 24 of the circular groove 23. The contact faces 2, are connected by an arch-shaped recess 4. The arch-shaped recess 4 is formed so that surfaces connected to the contact faces 2 cross at about 120 deg. A gap 5 is produced between the arch-shaped recess 4 and the bottom surface 24. Since the seal ring 1 is made of an elastic material, the sealing face which comes in contact with the bottom surface 24 is easily deformed. Therefore, the plane contact faces 2 and the arch-shaped recess 4 are not indispensable in the present invention. In other words, the contact faces 2 may be connected by a plane face.

In this configuration, when the seal ring 1 is mounted in the circular groove 23 formed in the peripheral surface of the shaft member 22, the projection 8 of the seal ring 1 projects out of the circular groove 23 in a condition where the seal ring 1 is not pressed from an outer side, as shown in FIG. 4. This is because that the seal ring 1 is raised by the elasticity of the inner leg portions 20 and the resilient force produced by the arch-shaped recess 4 formed between the inner legs 20.

Figure 6:
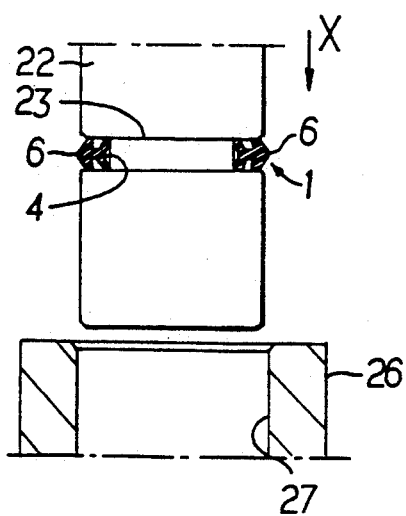
FIG. 6 is a sectional view showing a shaft member mounted with the seal ring shown in FIG. 4 being inserted into a cylindrical member.

As shown in FIG. 6, when the shaft member 22 is moved in a direction designated by an arrow X and inserted into the cylindrical member 26, the seal ring 1 is pressed inwardly by an inner side surface 27 of the cylindrical member 26, as shown in FIG. 5. Therefore, the projection 8 is pressed inwardly by the inner side surface 27 and the inner leg portions 20 are pressed toward the bottom surface 24 of the circular groove 23, so that the arch-shaped recess 4 is flattened. When the shaft member 22 is moved in this condition in the direction designated by the arrow X to a predetermined position, the seal ring 1 slightly inclines. However, the seal ring 1 does not fall because the end portions 10 of the outer leg portions 18 are supported by the side surfaces 25 of the circular groove 23, and because the seal ring 1 is sufficiently provided with the elasticity of the seal ring 1 itself as well as the resilient force produced by the arch-shaped recess 4 formed between the inner leg portions 20. Further, the deformation of the leg portions 18 and 20 is moderately absorbed by the side recesses 16. Therefore, the seal ring 1 is prevented from immoderately deforming, so that the shaft member 22 can be inserted into the cylindrical member 26 with a small operating force. Moreover, since the seal ring 1 is not immoderately deformed, a stable sealing face pressure can be maintained. The arch-shaped recesse 4 may be omitted. In case the arch-shaped recess 4 is omitted, the hardness in the elasticity of the seal ring 1 is increased.

Figure 7:
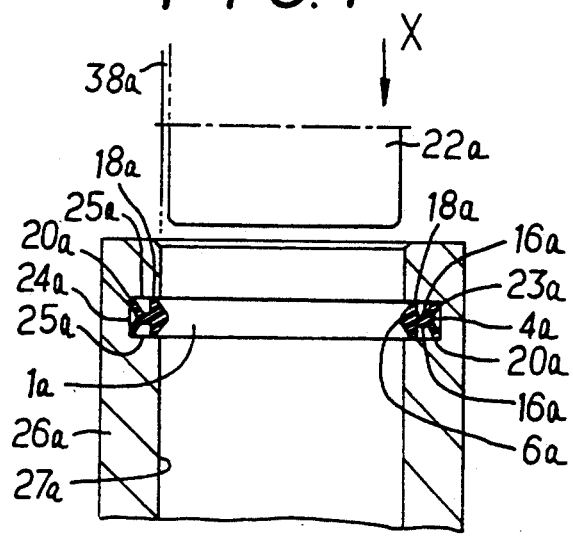
FIG. 7 is a sectional view showing a seal ring of a second embodiment according to the present invention.

Next, a second embodiment according to the present invention will be described with reference to FIG. 7.

In this embodiment, a cylindrical member 26a is provided with a circular groove 23a in an inner periphery surface thereof. A seal ring 1a is made of an elastic material such as rubber and is formed in a circular shape. The seal ring 1a is mounted in the circular groove 23a of the cylindrical member 26a. The seal ring 1a is provided with a projection 6a projecting toward the center of the seal ring 1a. Outer leg portions 18a are connected to the projection 8a, and arranged on the central side of the seal ring 1a are side recesses 16a. Inner leg portions 20a are arranged at the side of a bottom surface 24a of the circular groove 23a. An arch-shaped recess 4a is formed between the inner leg portions 20a. The projection 6a projects out of the circular groove 23a. Other features are similar to that of the first embodiment, and a duplicate explanation is thus omitted. In FIG. 7, similar reference numbers designate similar members or portions in FIGS. 4 through 6.

In the second embodiment, when the seal ring 1a is mounted the circular groove 23a, the projection 6a projects out of the circular groove 23a. Then, when the shaft member 22a is moved in a direction designated by an arrow X and inserted into the cylindrical member 26a, the seal ring 1a is pressed inwardly by an outer peripheral surface of the shaft member 22a. When the shaft member 22a is moved in this condition to a predetermined position of the cylindrical member 26a, the seal ring 1a slightly inclines. However, the seal ring 1a does not fall, because the outer leg portions 18a are supported by side surfaces 25a of the circular groove 23a, and because the seal ring 1a is raised by the elasticity thereof and the resilient force produced by the arch-shaped recess 4a. In this case, the deformation of the leg portions 18a and 20a are moderately absorbed by the side recesses 16a. The inner leg portions 20a can absorbed deformation in the radial direction by the elasticity thereof. Further, since the deformation of the seal ring 1a is small, the seal ring 1a is prevented from being drawn into a gap 38a between the shaft member 22a and the cylindrical member 26a, and thus prevented from being damaged.

What is claimed is:

1. A fluid sealing arrangement for sealing a first cylindrical member relative to another cylindrical member, said first cylindrical member having a circular groove in a surface thereof, said groove including two side surfaces and a bottom surface adjoining said side surfaces, and a seal ring disposed in said circular groove, said seal ring comprising:

a central projection projecting out of said circular groove for contact with an opposing surface of the other cylindrical member;

a first pair of elastic legs connected with said central projection and contacting respective said side surfaces of said circular groove; and a second pair of elastic legs connected with said central projection and said first pair of legs, radially spaced from said first pair of legs and contacting respective said side surfaces and said bottom surface of said circular groove;

wherein said seal ring has an outer surface which continuously slopes from said central projection into said circular groove until reaching said side surfaces to define an outer surface of said first pair of legs.

2. The fluid sealing arrangement of claim 1, wherein said first pair of legs have an inner surface and said second pair of legs have an outer surface between which is defined a recess at each said side surface.

3. The fluid sealing arrangement of claim 2, wherein said second pair of legs define an arched recess therebetween above said bottom surface of said circular groove.

4. The fluid sealing arrangement of claim 3, wherein said seal ring is a one-piece element made of an elastic material.

5. The fluid sealing arrangement of claim 4, wherein said elastic material is rubber.

* * * * *